Figure 3:
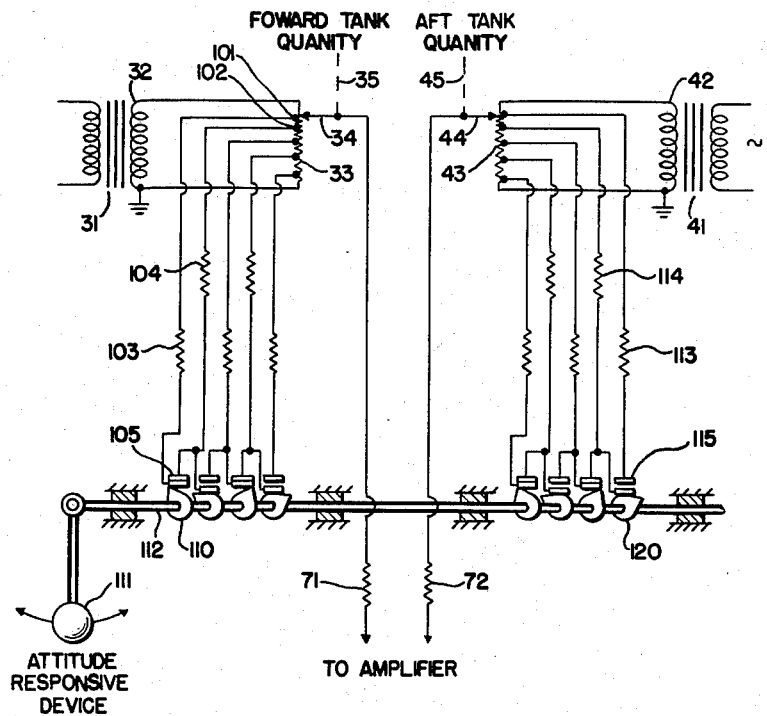

Aug. 9, 1960  R. L. BERGESON  2,948,146
CENTER OF GRAVITY INDICATOR
Filed Aug. 3, 1955  2 Sheets-Sheet 1
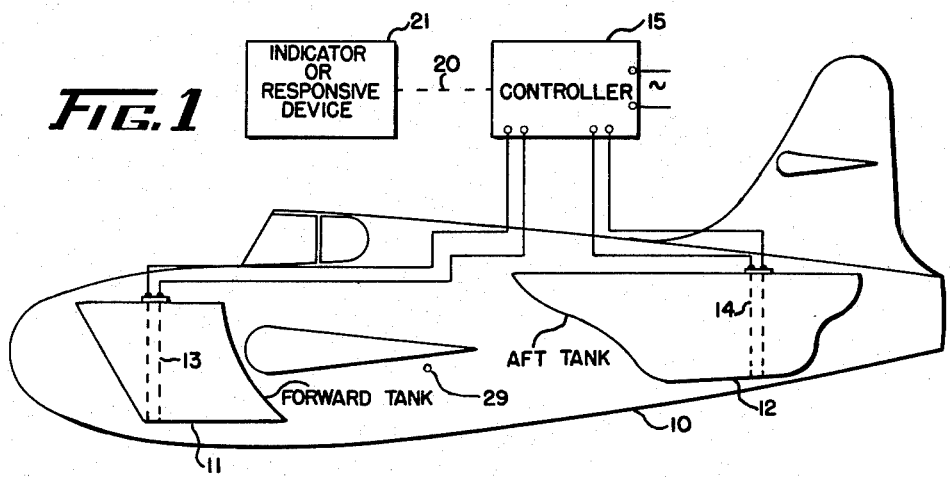
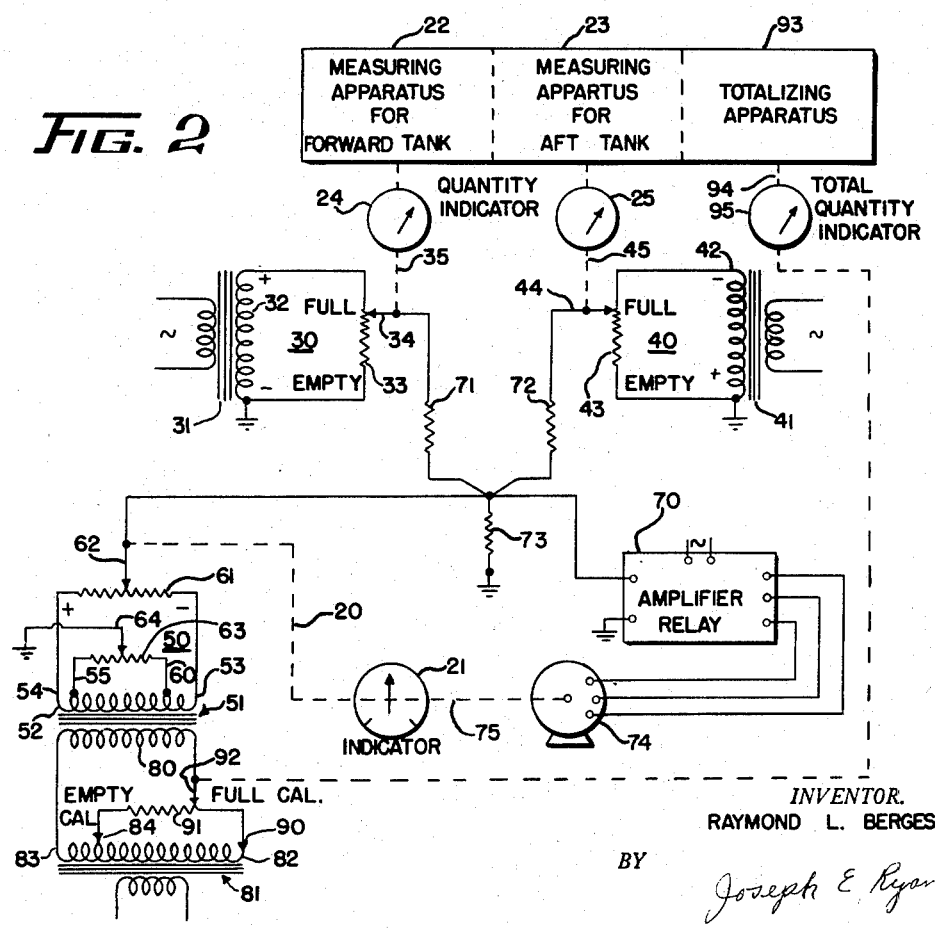
INVENTOR.
RAYMOND L. BERGESON
BY Joseph E. Ryan
ATTORNEY

United States Patent Office 2,948,146
Patented Aug. 9, 1960

2,948,146

CENTER OF GRAVITY INDICATOR

Raymond L. Bergeson, St. Paul, Minn., assignor to Minneapolis-Honeywell Regulator Company, Minneapolis, Minn., a corporation of Delaware Filed Aug. 3, 1955, Ser. No. 526,177

10 Claims. (Cl. 73—65)

The present invention is concerned with a center of gravity control system, in particular, a system responsive to the change in the center of gravity of a craft as various non-linear loads spaced about the craft are changed. In the present day aircraft the quantity of fuel carried by the craft in the plurality of tanks spaced about the craft is quite effective upon the location of the center of gravity of the craft. Often where fuel is consumed from these various tanks, a scheduling means is employed so that the consumption from the tanks is such as to maintain the center of gravity of the craft within predetermined limits for flight worthiness of the aircraft.

Previously, we have only been concerned with center of gravity systems for craft having linear tanks, that is, tanks in which the center of gravity position with respect to some arbitrary reference point on the craft remains the same regardless of the quantity of fuel in the tank. For example, in the Baldwin et al. Patent No. 2,751,921 issued June 26, 1956 a system is disclosed for providing a signal indicative of the weight or quantity of fuel in each of a plurality of tanks. This signal is fed through a summing resistor so that the resultant signal obtained for each tank is proportional to the moment of the fuel in that tank. As the tank units are of a linear type and the moment arm with respect to some arbitrary reference point is constant a fixed summing resistance of some selected value is used, for each tank.

The present invention is concerned with an improved system for indicating or responding to the center of gravity of a craft having a plurality of non-linear tanks thereon. Associated with each tank is a quantity responsive device for positioning a movable member of a characterized signal source so that the signal obtained is proportional to the amount of that particular tank with respect to an arbitrary axis. The moments for a plurality of tanks are summed in a balanceable electrical network and the re-balance voltage of the network is modified by a signal indicative of the total quantity of fuel on the craft. No matter what the shape of the tank the mentioned signal source is calibrated so that as the fuel level and thus the weight or quantity of fuel in the tank is reduced and the center of gravity of the tank changes with respect to the arbitrary axis, the fuel moment signal is continually supplied to the balanceable network circuit.

It is therefore an object of the present invention to provide an improved center of gravity system.

Another object of the present invention is to provide an improved center of gravity system particularly adapted for craft having non-linearly changing loads distributed about the craft.

A further object of the present invention is to provide an improved apparatus having an output indicative of the center of gravity of an aircraft which has a plurality of non-linear tank units spaced about an arbitrary axis on the craft, a signal being obtained from a characterized signal source associated with each tank indicative of the fuel moment produced with respect to the axis by the quantity of fuel in that tank.

A still further object of the present invention is to provide an improved center of gravity apparatus having an attitude responsive device.

These and other objects will become apparent upon a study of the following specification and drawings, of which Figure 1 is a schematic drawing of a typical application of the present invention when used on an aircraft having a non-linear forward and aft fuel tanks;

Figure 2 is a schematic drawing of the electrical circuit of the present invention; and Figure 3 is a schematic drawing of one particular embodiment of a device for adding attitude compensation to the present invention.

Referring to Figure 1, a craft, in particular an aircraft 10 has a forward tank 11 and aft tank 12 connected into a fuel supply system for the various engines on the aircraft. The fuel system is not shown. The tanks are both shown for illustrative purposes as non-linear; however this invention is applicable to any combination of non-linear and linear tanks. Inserted in each tank is a capacitance type quantity or weight measuring device 13 and 14 of a sort shown in the Griffith Patent No. 2,563,281. These units are connected to a controller 15 which has an output at 20 connected to an indicator or responsive device 21.

Referring to Figure 2, measuring apparatus 22 and 23 for the forward and aft tanks are shown in block diagram form. Such apparatus is of the sort shown in a Bancroft Patent No. 2,793,529 issued May 28, 1957 in which a capacitance type bridge circuit having a tank unit similar to 13 and 14 as shown in Figure 1 produces an output indicative of quantity or weight of fuel to drive a motor to position an indicator.

A signal source 30 comprises a transformer 31 having a secondary 32 to which a characterized potentiomteer resistor 33 is connected. Resistor 33 has a movable wiper 34 positioned thereon by an output shaft 35 of the aforementioned measuring apparatus 22. As the lower end of secondary 32 is grounded the voltage obtained from wiper 34 is a maximum when it is in the upper extreme position and decreases in a non-linear manner as the wiper moves downward. Resistor 33 is characterized so that the signal obtained from source 30 as wiper 34 is positioned indicative of the quantity or weight of fuel in tank 11 is proportional to the moment of the fuel in that tank with respect to some arbitrary reference point or axis 29 on the craft. It is obvious that the shape of the tank must be considered in designing resistor 33 as the moment of the fuel in that tank is a function not only of the weight but the distance the center of gravity of the fuel in the tank is from the reference axis. As the fuel is consumed for tank 11, the center of gravity of the tank moves to the right thus the moment of the quantity of fuel in that tank does not depend upon quantity alone.

A similar signal source 40 comprises a transformer 41 with a secondary 42 having its lower extremity grounded. A potentiometer with a characterized resistor 43 is connected across secondary 42 so that movable wiper 44 positioned on resistor 43 in accordance with the output of measuring apparatus 23 when connected thereto by shaft 45 produces a signal indicative of the fuel moment of the fuel in aft tank 12. While only two tank units and the associated signal sources 30 and 40 are shown it is obvious that a plurality of tanks and associated signal sources could be provided. The sense or phase of the voltage obtained from the signal source is selected so that a first phase is used for all signal sources of the tank units on one side of the reference axis and the signal sources of all tank units on the opposite side of the reference axis have an opposite phase. For the signal sources 30 and 40 the transformers 31 and 41 are so connected that the phase of the voltage obtained therefrom is opposite. It should be further recognized that the center of gravity of the craft is only being considered with respect to axis 29; however, a similar consideration could be made with respect to an axis running lengthwise through the craft for other tanks or any other axis desired.

A rebalance signal source 50 has a transformer 51 with a secondary winding 52 having two end terminals 53 and 54 and two taps 55 and 60 between the end terminals. A rebalance resistor 61 is connected to end terminals 53 and 54, it having a wiper 62 positioned thereon. A calibration resistor 63 is connected between taps 55 and 60, it having a movable wiper 64 thereon which is connected to ground.

The output of signal sources 30 and 40 is connected to the input terminal of an amplifier 70 through summing resistors 71 and 72, respectively. The input terminal is connected to ground through a resistor 73. A second input terminal of the amplifier is grounded. The output of network 50 obtained from movable wiper 62 is connected to the first mentioned input terminal of amplifier 70. The amplifier is connected to a motor 74. The amplifier and motor combination are of a type disclosed in the Albert P. Upton Patent No. 2,423,534, in which the reversible motor is controlled by the phase and magnitude of the input signal to the amplifier. In this particular application when the input signal to amplifier 70 is one phase the motor will run in a first direction and a reversal in the phase causes the motor to run in the other direction. The motor is connected by a shaft or suitable connecting member 20 to movable wiper 62 so that abalanceable electrical network circuit is obtained. The output signals of networks 30 and 40 are combined and the resultant having a particular phase and magnitude renders motor 74 operative in one direction to reposition wiper 62 until the signal from network 50 is such as to balance this resultant signal from sources 30 and 40 thereby establishing a null condition which then renders the motor inoperative.

Primary winding 80 of transformer 51 is connected to a source of power 81 having a secondary 82 with an end terminal 83 and two adjustable taps 84 and 90. Connected between the taps is a resistor 91 having a movable wiper 92 positioned thereon. Primary 80 is connected to end terminal 83 and wiper 92, so that the voltage obtained from source 81 depends upon the position of wiper 92 and the positions of wipers 84 and 90 which are for calibration purposes.

A totalizing apparatus 93 is of a sort also shown in the aforementioned Bancroft patent. In such an apparatus the signals obtained from the bridge circuits of the aforementioned measuring apparatus 22 and 23 are combined and an output at shaft 94 indicative of the total quantity of fuel in tanks 11 and 12 as sensed by tank units 13 and 14 is obtained. Output shaft 94 which positions an indicator 95 is connected to wiper 92 so that its position as it moves from left to right is indicative of the total quantity or weight of fuel in all of the tanks on the craft. In the extreme right position the tanks are full and in the extreme left position the tanks are empty.

An indicator or responsive device 21 is connected to motor 74 by a shaft 75 which consitutes a part of the aforementioned shaft 20. This indicator upon proper calibration of the apparatus indicates the center of gravity of craft 10, that is its position forward or behind the reference axis 29. With the fuel tanks empty the apparatus is calibrated so that it indicates the center of gravity of the unloaded craft and upon filling the tanks with fuel any change or deviation in the original craft center of gravity is indicated. Normally such an indicator is calibrated in terms of mean aerodynamic chord.

Referring to Figure 3 another embodiment of the present invention is shown by which the center of gravity indicating or control system is modified by an attitude responsive device which is responsive to the aircraft's attitude. The attitude compensation is provided by further characterizing the signal sources 30 and 40 shown in Figure 2 so that the outputs obtained as wipers 34 and 44 are positioned on their associated resistors are indicative of the fuel moment of the fuel in the particular associated tank taking into account both the changing center of gravity of the fuel in the tank as the quantity changes as well as changes in the craft's attitude.

The signal sources are modified, as shown in Figure 3, by placing a plurality of selectively shunting circuits between various taps on the resistor 33 as well as resistor 43. One of the shunt circuits is placed from an uppermost tap 101 on resistor 33 through resistor 103, switch 105, resistor 104 and back to a second tap 102. Switch 105 as well as the other switches connected in similar shunting circuits is controlled by a cam 110 connected to an attitude responsive device shown schematically as a pendulum 111 connected to move the cam shaft 112. As the craft changes attitude it is obvious that pendulum 111 will seek the lowermost position and in doing so will operate switch 105 as well as the other associated switches to shunt out various portions of resistor 33 to characterize its output for changes in the attitude of the craft. A similar arranegment is shown for characterizing resistor 43. One portion of the resistor is selectively shunted by a circuit through resistor 113, switch 115, and a resistor 114. Switch 115 as well as the other associated switches is operated by a cam 120 connected to shaft 112. By the proper selection of the various resistors in the circuit and the cam positions with respect to shaft 112 the center of gravity apparatus as disclosed in Figure 2 can be modified by an arrangement as shown in Figure 3 so that indicator 21 will indicate the position of the center of gravity of the craft 10 not only as the quantity of the fuel in the tanks 11 and 12 changes but also as the attitude of the craft modifies the center of gravity of each individual tank.

*Operation*

Normally, calibration of the center of gravity system is done with no fuel in the tanks; however, it may be accomplished by manually moving the wipers 34, 44, and 92 to the empty extremity of their associated resistors 33, 43, and 91, this being opposite that as shown in Figure 2. The signal to the amplifier 70 is then only the output of network 50 and by adjustment of wiper 64 indicator 21 is calibrated to indicate the center of gravity of the craft with no fuel in the tanks. Such of course would be known by the design of the craft. A small adjustment of either wiper 34 or 44 to indicate the addition of fuel to the craft would produce a deviation in the center of gravity as indicated by indicator 21. The calibration of this indication with the empty tanks is made by wiper 84. With the wipers 34, 44 and 92 as shown in the full position a similar calibration of indicator 21 is made by wiper 90, this being the full calibration.

Thus as shown with full tanks indicator 21 indicates to the pilot of the aircraft exactly where the center of gravity is at that time. The resultant output of signal sources 30 and 40 is balanced by the output of network 50 and the amplifier has rendered motor 74 inoperative. Let us assume that the quantity of fuel in tank 11 decreases so that wiper 34 moves downward and the magnitude of the voltage from source 30 decreases. The resultant signal to the input of amplifier 70 thus changes and the system is unbalanced causing motor 74 to be energized in the appropriate direction to move wiper 62 to rebalance the network. At the same time that the quantity of fuel in tank 11 causes the wiper 34 to move downward the total quantity of fuel also decreases so that wiper 92 moves to the left thus decreasing the magnitude of the voltage output from network 50. Thus the movement of wiper 62 to obtain a predetermined rebalance voltage increases as the total fuel quantity decreases.

The network actually provides for the calculation of the deviation of the center of gravity from some arbitrary reference axis. The outputs of the signal sources are indicative of the individual fuel moments thus the resultant voltage is the fuel moment of the total weight of all the fuel on the craft with respect to the reference axis. This signal or quantity is then divided by a signal indicative of the weight of the aircraft and the weight of the fuel on the aircraft. By proper balance between these two signals the deviation of the center of gravity is indicated by indicator 21. By observing indicator 21 the pilot of the aircraft at all times is aware of the position of the center of gravity of his craft and if the indicator is calibrated by mean aerodynamic chord he will know when his craft is flightworthy as the flying conditions for an aircraft are best attained when the center of gravity of the aircraft is within an allowable deviation range on the mean aerodynamic chord.

Upon modifying the signal sources 30 and 40 as shown in Figure 3 so that the output of each is characterized in response to the attitude of the aircraft by the arrangement as shown in Figure 3, the center of gravity of the aircraft as indicated by indicator 21 not only depends upon the quantity of fuel in each of the tanks but indicates a change in the center of gravity of the craft should the attitude of the craft change. Such an arrangement is quite necessary where the attitude of an aircraft changes as a result of its varying flight pattern or even as a result of a change in the load on the craft which causes its attitude to shift. When non-linear fuel tanks the center of gravity of the tank, as here concerned changes, this center of gravity also might change as the tank is tilted one way or the other upon a change in attitude of the craft.

The attitude responsive device 111 provides for a further characterization of resistors 33 and 43 in the signal source 30 and 40, respectively so that the fuel moment signal obtained as the wipers 34 and 44 are positioned thereon is a true fuel moment signal regardless of the flight position of craft 10. These signals are fed into the amplifier through the summing resistors 71 and 72 and provide for the operation of motor 74 to position indicator 21 in a similar manner as the apparatus of Figure 2 is described.

While the invention has been described applicable to an aircraft it is obvious that load distribution is important on other crafts and one could very well apply this invention to other applications, therefore it is intended that the invention only be limited by the scope of the appended claims.

I claim as my invention:

1. In a center of gravity indicating system for a craft having a plurality of fuel tanks; first means for obtaining an output which is a function of the quantity of fuel in a first tank on one side of an arbitrary reference axis; second means for obtaining an output which is a function of the quantity of fuel in a second tank on the opposite side of said axis; a first characterized signal source of one phase; means connecting the output of said first means in controlling relation to said first signal source so that a signal is provided indicative of the fuel moment of the fuel in said first tank with respect to said reference axis; a second characterized signal source of an opposite phase to said one phase; further means connecting said second means in controlling relation to said second signal source so that a signal is provided indicative of the fuel moment of the fuel in said second tank with respect to said reference axis; rebalance means, said rebalance means having an adjustable member for producing a signal having a range from said one phase through a neutral point to said opposite phase; phase sensitive relay means; motor means; said relay means controlling the operation of said motor means; circuit means connecting said first and second signal sources and said rebalance means to said relay means so that said relay means is energized by the sum of the signals from said first and second signal sources and the signal from said rebalance means; connection means connecting said motor means to said adjustable member so that upon a change in the magnitude of the the signals from said first and second signal sources said motor means operates to position said adjustable member to null the sum of the signals to said relay means; further quantity responsive means responsive to the quantity of fuel in all of said fuel tanks; a variable voltage source connected to said further quantity responsive means and to said rebalance means for decreasing the magnitude of the signal from said rebalance means as the total quantity of fuel decreases; and indicator means driven by said motor means for indicating the deviation of the center of gravity of said craft from said reference axis.

2. In a center of gravity system for an aircraft having a plurality of fuel tanks arranged about an arbitrary reference axis, the center of gravity of each of the tanks varying with respect to said reference axis as the quantity of fuel is consumed therefrom: quantity responsive means for each of the tanks having a movable member the position of which is indicative of the quantity of fuel in that particular tank; a characterized voltage source for each of the tanks having a first or an opposite phase depending upon which side of the reference axis the tank lies and each source having an adjustable member; means connecting each of said movable members to a respective adjustable member so that a voltage output is obtained from each of said sources, the phase of which depends on the sign of a weight moment produced by the quantity of fuel in that particular tank with respect to the said reference axis and the magnitude of which is proportional to the magnitude of said weight moment; amplifier relay means; motor means, said motor means being controlled by said relay means; rebalance means having a voltage output the magnitude and phase of which depend upon the position of a movable member, said movable member being controlled by said motor means; means connecting the output of said rebalance means and the output of each of said voltage sources to said relay means, said motor means operating to position said movable member so that a resultant voltage of said voltage sources having a particular phase is balanced by said rebalance means to bring about a balanced condition; total quantity responsive means having a movable member the position of which is indicative of the total quantity of fuel in all of said tanks; means connected to said last mentioned movable member for varying the magnitude of the voltage of said rebalance means; and means connected to said motor means to indicate changes in the center of gravity of the aircraft as it varies with respect to said arbitrary reference axis.

3. In a center of gravity system for a craft carrying a quantity of liquid in a plurality of non-linear tanks, the center of gravity of each tank varying as the quantity of liquid therein changes: first quantity responsive means for a first tank; first characterized signal means; means connecting said quantity responsive means in a manner to control said signal means to give a first output which has a magnitude indicative of the moment produced by the liquid in the first tank with respect to a reference axis and a sense indicative of the sign of said moment; second quantity responsive means for a second tank; second characterized signal means; further means connecting said second quantity responsive means in a manner to control said second signal means to give a second output which has a magnitude indicative of the moment produced by the liquid in the second tank with respect to said axis and a sense indicative of the sign of said moment; motor means; signal balance means, said signal balance means being controlled by said motor means; means connecting said outputs of said first and said second signal means and an output of said signal balance means to said motor means, said output of said signal balance means having a sense and magnitude as controlled by said motor means to balance the resultant of the outputs of said first and second signal means; means responsive to the total quantity of liquid in the plurality of tanks; means controlled by said last named means for varying the output of said signal balance means in accordance with total quantity; and means connected to said motor means and operable thereby in accordance with the center of gravity of the craft.

4. In a center of gravity system for a craft carrying a load the distribution of which is subject to change: first means responsive to the weight of that portion of the load on one side of an arbitrary reference axis, said responsive means having a characterized output of a first sense indicative of the moment of the aforesaid portion of the load with respect to the said reference axis; second means responsive to the weight of that portion of the load on the opposite side of said reference axis, said second responsive means having a characterized output of a second sense indicative of the moment of the second mentioned portion of the load with respect to the said reference axis; rebalance means having an output of a sense which is adjustable to be the same or the opposite to the sense of the output of said first responsive means; motor means, said motor means connected to adjust said rebalance means; means connecting the outputs of said first and second responsive means and said rebalance means to said motor means so that upon the existence of a resultant voltage between the outputs of said first and second responsive means said motor will adjust said rebalance means to balance out said resultant voltage; further means responsive to the total weight of said load; means adjusted by said further means for varying the output of said rebalance means in accordance with total weight of the load; and means responsive to the output of said motor means being indicative of the center of gravity of the craft.

5. In a center of gravity system for a craft having a load whose distribution about the craft is subject to change, the center of gravity of each of the various portions of load varying with respect to an arbitrary axis on the craft as the weight of that portion changes: first means responsive to the weight of one portion of the load and having a characterized output whose sense and magnitude are indicative of the moment of that portion with respect to the arbitrary axis; second means responsive to the weight of a second portion of the load on the opposite side of the axis and having a characterized output whose sense is opposite said first mentioned sense and whose magnitude is indicative of the moment of that portion with respect to the axis; balance means having an output depending in magnitude and sense upon the position of an adjustable member; motor means; means connecting the outputs of said first and second means and said balance means to said motor means; further means connecting said motor means to said adjustable member to vary the output of said balance means so that the outputs of said first and second responsive means are balanced by the output of said balance means; third means having an output variable in accordance with the total weight of the load of said craft; means connected to the output of said third means for varying the magnitude of the output of said balance means in accordance with the total weight of the load of said craft; and means operable by said motor means indicative of the position of the center of gravity of the craft.

6. In a center of gravity control system for a craft having two loads one on each side of an arbitrary axis: first and second quantity responsive means responsive to the quantity of the loads; first and second signal sources; means connecting said first responsive means in controlling relation to said first signal source so that a signal output from said first signal source is available indicative of the moment of a first of the loads with respect to the arbitrary axis; means connecting said second responsive means in controlling relation to said second signal source so that a signal output from said second signal source is available indicative of the moment of a second of the loads with respect to the arbitrary axis; relay means; motor means, said relay means controlling said motor means; rebalance means having a connection to said motor means and having an output adjusted thereby; means having an output variable in accordance with the total quantity of the loads; means connecting said variable output to said rebalance means to vary the output of said rebalance means in accordance with the total quantity of the loads; means connecting the outputs of said first and second signal sources and said rebalance means to said relay means, said motor means operating said rebalance means to reduce the sum of the signals to said relay means to zero; and indicator means actuated by said motor means.

7. A rebalanceable center of gravity system for a craft having a load the center of gravity of which changes with the amount of the load and the attitude of the craft, comprising: means responsive to the quantity of the load; signal source means connected to the first named means and having an output the magnitude of which is indicative of the moment of the load about an arbitrary axis and having a first or an opposite sense depending on whether the center of gravity of the load is on a first or second side of the arbitrary axis; craft attitude responsive means connected to said signal source means to adjust the output thereof according to changes in attitude of the craft which affect the center of gravity of the load; signal responsive means connected to the output of said signal source means to derive a rebalance signal of equal magnitude but of opposite sense to the output of said signal source means; means connecting the rebalance signal to the output of said signal source means; and means connected to said signal responsive means being indicative of the center of gravity of the load.

8. In a center of gravity control system for a craft having a plurality of nonlinearly variable loads whose centers of gravity change with respect to an arbitrary axis as the quantities of the loads vary and as the craft attitude changes: first and second means responsive to the magnitudes of a first and a second load; a first and a second signal source of a first and an opposite sense respectively; means connecting said first and second means to said first and second signal sources, respectively, independently to control the outputs thereof to be indicative of the moments of the loads with respect to the arbitrary axis; means responsive to craft attitude; means connecting said craft attitude responsive means to said first and second signal sources to adjust the outputs thereof as the moments of the loads change due to change of attitude of the craft; means combining the outputs of said first and second signal sources; means connected to the combined outputs and operable thereby to derive a third signal equal in magnitude but opposite in sense to the combined outputs; and means connecting the third signal to the outputs of said first and second sources to reduce the combined outputs to zero, the magnitude and sense of the third signal being indicative of the center of gravity of the craft.

9. In a center of gravity control system for a craft having a plurality of fuel tanks, the center of gravity of each fuel tank depending upon the total quantity of fuel therein and the attitude of the craft; quantity responsive means for each tank; a characterized signal source for each tank; means connecting each of said quantity responsive means in controlling relation to its respective signal source; craft attitude responsive means connected with each of said signal sources to vary the output of each signal source so that the output is indicative of the fuel moment of its respective tank with respect to an arbitrary axis as the quantity of fuel in the tank changes and as the craft attitude changes; means having an output indicative of the total quantity of fuel in all tanks; circuit means connected to receive the outputs of said signal sources and to derive a rebalance signal of equal magnitude but opposite sense to the outputs of said signal sources; means connecting said total quantity signal output to said circuit means to vary the rebalance signal in accordance with total quantity; means connecting said rebalance signal to the outputs of said signal sources; and means responsive to said combined outputs of said signal sources and said rebalance signal for indicating the center of gravity of the craft with respect to the said arbitrary axis.

10. A center of gravity system for a craft having a plurality of loads whose moments about an arbitary axis vary with time and with craft attitude comprising, in combination: means giving first and second signals representative in magnitude and sense of the magnitudes of said loads and the senses of their moments about said axis; means responsive to craft attitude for adjusting said signals in accordance with changes in the attitude of the aircraft which vary the moments of the loads; means giving an output determined by the sum of said loads; means deriving from said output a further signal variable in magnitude and reversible in sense; and means connected to receive said first, second and further signals and actuated in accordance with the sum of said signals for adjusting said further signal to reduce said sum to zero, the magnitude and sense of said further signal being indicative of the center of gravity of the craft.

References Cited in the file of this patent

UNITED STATES PATENTS

| | | |
|---|---|---|
| 2,388,559 | Macintyre | Nov. 6, 1945 |
| 2,443,045 | Magruder et al. | June 8, 1948 |
| 2,443,098 | Dean | June 8, 1948 |
| 2,520,428 | Nilakantan | Aug. 29, 1950 |
| 2,540,807 | Berry | Feb. 6, 1951 |
| 2,541,429 | Mathes | Feb. 13, 1951 |
| 2,563,281 | Griffith | Aug. 7, 1951 |
| 2,579,220 | Vine | Dec. 18, 1951 |
| 2,688,875 | DeBoisblanc | Sept. 14, 1954 |
| 2,735,291 | Quinn | Feb. 21, 1956 |
| 2,872,807 | Kolisch | Feb. 10, 1959 |